United States Patent [19]

Astrack et al.

[11] 4,376,130

[45] Mar. 8, 1983

[54] OZONOLYSIS OF WHOLE CARDAMON SEEDS

[76] Inventors: Alexander Astrack, Hillcrest La., Upper Brookville, N.Y. 11771; Charles G. Schoenfeld, 1 Diana Trail, Staten Island, N.Y. 10304

[21] Appl. No.: 258,607

[22] Filed: Apr. 29, 1981

[51] Int. Cl.³ .............................................. A23L 1/277
[52] U.S. Cl. .................................. 426/253; 426/261; 426/255; 426/312
[58] Field of Search ............... 426/253, 235, 236, 261, 426/255, 312, 320

[56] References Cited

FOREIGN PATENT DOCUMENTS 12046 of 1903 United Kingdom ................. 426/253

OTHER PUBLICATIONS

Rideal, Ozone, 1920, Constable & Co. Ltd., London, pp. 158-159.
Pruthi, Spices and Condiments, Chemistry Microbiology Technology, 1980, Academic Press, New York, pp. 178-192.
Jacobs, The Chemistry and Technology of Food and Food Products, vol. I, 1951, Interscience Publishers, New York, pp. 752-758.

Primary Examiner—Joseph M. Golian
Attorney, Agent, or Firm—Kane, Dalsimer, Kane, Sullivan & Kurucz

[57] ABSTRACT

Whole cardamon seeds, either green or sun-dried, are subjected to ozonolysis to bleach the seed pods to an off-white color.

1 Claim, 1 Drawing Figure

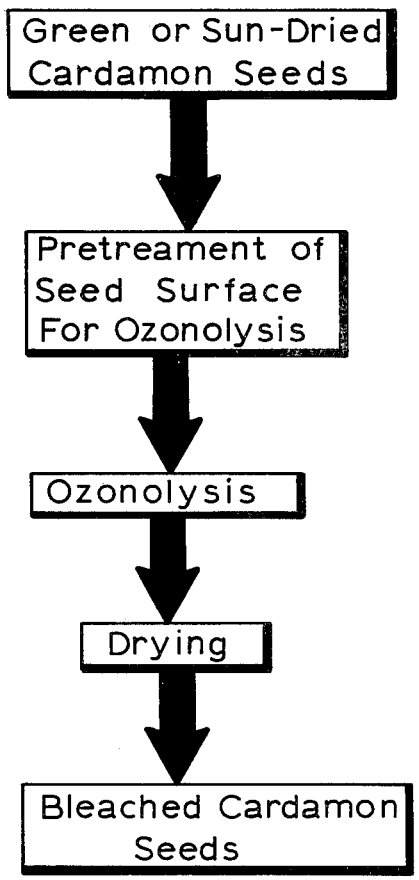

OZONOLYSIS OF WHOLE CARDAMON SEEDS

BACKGROUND OF THE INVENTION

1. Field of the Invention

The invention relates to the treatment of edible seeds and more particularly relates to the bleaching of cardamon seed pods.

2. Brief Description of the Prior Art

Cardamon seeds (also referred to at times as cardamum or cardamom seeds) are the aromatic seeds of two Asian plants of the ginger family (genera Elettaria and Amomum) used as condiments and as a mild carminative. As harvested, the husks or hulls (pods) of the seeds are of a green hue due to the presence of chlorophyll. The harvested whole seeds may be initially processed by drying them in the sun, whereby the hulls may become brownish in color.

Historically, the green-hued or brownish whole seeds have been esthetically unacceptable to the consumer who would prefer an off-white or bleached color and will pay a higher market price for the preferred product. To meet this demand, the green and sun-dried cardamon seeds have heretofore been bleached by exposure to sulfur dioxide vapors. This process has not been entirely satisfactory in that the handling of sulfur dioxide is potentially hazardous, relatively expensive and leaves a residual proportion of the sulfur dioxide on the bleached seeds. When above standard levels permitted by the food and drug laws, this residual material must be removed in additional process steps.

The method of the present invention is advantageous over the prior art process for bleaching whole cardamon seeds in that it is more economical, has less of an impact on the environment and leaves no undesirable residual matter on the seed pods and provides a product of higher quality. As determined by organoleptic evaluation, there is no adverse effect upon taste or aroma of the cardamon seeds treated by the method of the invention.

SUMMARY OF THE INVENTION

The invention comprises a method of bleaching green or sun-dried whole cardamon seeds, which comprises; subjecting said seeds to ozonolysis.

BRIEF DESCRIPTION OF THE DRAWING

The drawing shows a flowsheet for the treatment of cardamon seeds.

DETAILED DESCRIPTION OF THE PREFERRED EMBODIMENTS OF THE INVENTION

Those skilled in the art will gain an appreciation of the invention from a reading of the following description of a preferred embodiment of the invention, in conjunction with a viewing of the accompanying drawing.

As shown in the accompanying drawing, the whole cardamon seeds as initially provided are "green" or sun-dried. The term "green" as used herein is descriptive of harvested cardamon seeds, the hulls of which possess a green hue due to the presence of chlorophyll. If the harvested green seeds are exposed to sunlight for a period of time, they are at least partially dried and the chlorophyll is at least partially degraded with a concomitant discoloration (to a brown shade).

In the preferred method of the invention, the provided cardamon seeds are treated to render them more amenable to ozonolysis. At a minimum, the seed outer hull or pod surfaces are wetted with water. Wetting may be carried out by any conventional technique, such as by spraying the whole seeds with water, immersion in an appropriate vessel and like techniques. Preferably, the whole seeds are washed a plurality of times (with a change of wash water) in a vessel equipped with means for stirring the mixture of seeds and water.

It is advantageous to employ as the wash or wetting medium, water containing a surfactant. The surfactant aids in removing gums which are a naturally occurring coating on the seed pods. Closer contact can then be achieved between the pod and ozone used subsequently.

The term "surfactant" as used herein is a contraction of "surface-active agent" and is a broadly descriptive term used to describe a chemical compound which is (1) soluble in at least one phase of a system, (2) has an amphipathic structure, (3) the molecules of which form oriented monolayers at phase interfaces, (4) exhibits an equilibrium concentration as a solute at a phase interface, greater than its concentration in the bulk of the solution, (5) forms micelles when the concentration as a solute in solution, exceeds a characteristic limiting value and (6) exhibits some combination of the functional properties of detergency, foaming, wetting, emulsifying, solubilizing and dispersing. Surface-active agents are generally classed as anionic, cationic or non-ionic. Preferred as surface-active agents in the method of the invention are those of the non-ionic type. Non-ionic surface active agents are generally well-known as is the method of their preparation. Representative are the alkylphenoxypoly (ethyleneoxy) ethanols such as the octylphenoxypoly (ethyleneoxy) ethanols and nonylphenoxypoly (ethyleneoxy) ethanols having polyoxyethylene moieties averaging from 8 to 15 units in length. Other non-ionic surfactants which may be employed are represented by polyethylene oxides, polypropylene oxides, long chain alkyl phosphine oxides, long chain alkyl amine oxides and the like. The proportion of surface-active agent employed in the wetting medium may be within the range of from about 0.001 to 1 percent by weight of the medium, preferably around 0.2 percent. The presence of the surfactant on the seed pods during ozonolysis is not necessary and may be removed by subsequent washing with water, free of surfactant, if desired.

Alternative to treatment with a surfactant containing wash or wetting medium, but less preferred because of the increased expense, one may employ as the wetting medium an aqueous solution of a peroxy radical, as may be obtained for example by the addition of hydrogen peroxide to water. In general, a proportion within the range of from about 0.5 to about 10 percent by weight of hydrogen peroxide is added to the wash water. Although we are not to be bound by any theory of operation, it is believed that the presence of a peroxy radical on the outer surface of the whole cardamon seed may promote auto-oxidation of the chlorophyll and other colorants during ozonolysis.

Following pretreatment, or preparation of the cardamon seeds for ozonolysis, the wet seeds are subjected to ozonolysis in the method depicted in the accompanying drawing. Ozonolysis is carried out by exposure of the wet whole seeds to ozone. Ozone is a gaseous allotropic form of the common element oxygen in which three atoms form the molecule rather than the normal two.

Ozone is a strong oxidizing agent. As such it breaks carbon to carbon double bond linkages which may often be responsible for color. The carotenoids, for example, are highly unsaturated and are readily bleached from their natural reddish color. Lignins and flavanoid materials are similarly attacked as is chlorophyll.

However, ozone is not a specific oxident, it will oxidize any material it contacts having a lower oxidation potential. The spice fragrances are often of a terpene character and are susceptible to alteration of the molecule by ozone. This may result in flavor or aromatic changes as well as color. It is therefore unexpected that in the method of the present invention, exposure of the whole cardamon seed to ozone does not adversely affect the flavor and aroma of the seeds. Instead, the ozonolysis appears to be restricted to the degradation of chlorophyll and other colorants in the pod of the seed so that a bleached, off-white, color is obtained.

Ozonolysis may be carried out by generating the ozone gas and bringing the gas into physical contact with the wet, whole seeds within an appropriate vessel. Advantageously, contact is within a vessel equipped with means for agitating the seeds with maximum exposure to the gas. Such agitation is conveniently obtained, for example, in a ribbon blender.

Ozonolysis is a sterilizing process and those skilled in the art will appreciate that following ozonolysis the seeds will be characterized in part by being supportive of a lower bacteria count.

The time required for ozonolysis to achieve the desired degree of bleaching will vary somewhat depending on the coloration of the seeds to be bleached. In general, ozonolysis will affect the desired degree of bleaching within about 2 to 24 hours. Upon completion, the bleached seeds may be dried by conventional techniques to obtain the final product, bleached cardamon seeds of high quality and market acceptance.

The method of the invention may be carried out continuously or to produce batch lots.

The following examples describe the manner and process of making and using the invention and set forth the best mode contemplated by the inventor of carrying out the invention but is not to be construed as limiting.

EXAMPLE 1

A quantity of green cardamon seeds is charged to an appropriate blender and washed three times with an aqueous solution containing 0.2 ml. of a non-ionic detergent per 100 ml. of water. The washed seeds are filtered and reused three times with distilled water and then charged to a ribbon blender. While wet, the seeds are mixed while ozone gas is passed through the blender at a rate of 0.5 liters per minute. After 240 minutes, the seeds are removed from the blender and dried with warm air (120° F.) to obtain seeds, the pods of which are bleached to an off-white color.

EXAMPLE 2

The procedure of Example 1, supra., is repeated except that in place of the green seeds, sun-dried seeds are bleached. Ozone treatment is carried out for 18 hours, after which bleached seed pods are obtained of a color comparable to those obtained in Example 1, supra.

What is claimed:

1. A method of bleaching green or sun-dried whole cardamon seeds, which comprises; washing the seeds to remove surface coatings of gums and waxes; wetting the whole seeds with water containing a surfactant; contacting the wet seeds with an oxidizing agent consisting of ozone; and drying the seeds after contact with the ozone.

* * * * *